UNITED STATES PATENT OFFICE 2,118,772

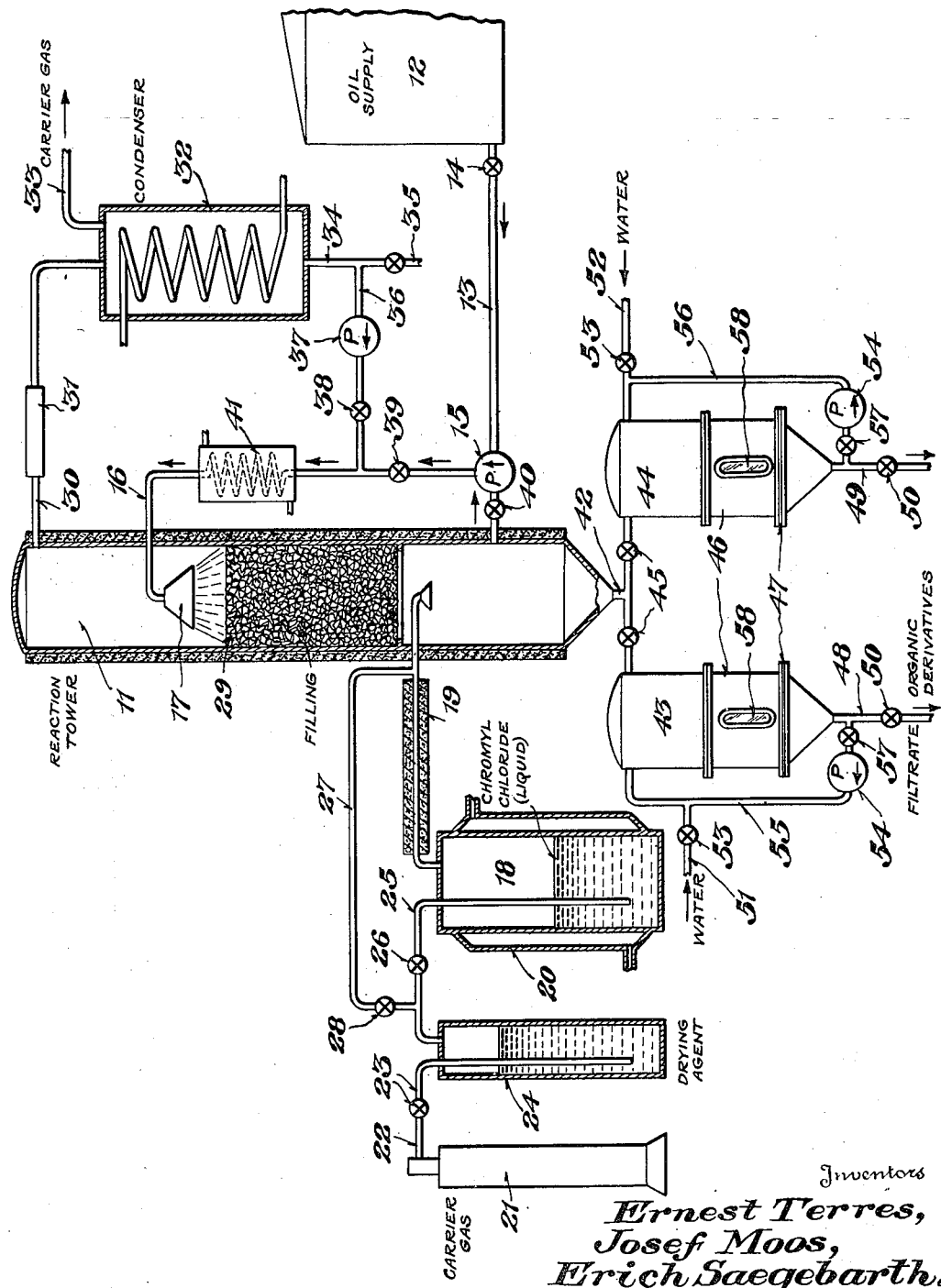

TREATMENT OF HYDROCARBONS WITH CHROMYLCHLORIDE

Ernest Terres, New York, and Erich Saegebarth, Long Island City, N. Y., and Josef Moos, Berlin-Mariendorf, Germany, assignors, by mesne assignments, to Edeleanu Gesellschaft, m. b. H., Berlin, Germany, a corporation of Germany Application March 26, 1935, Serial No. 13,180

9 Claims. (Cl. 196—78)

Our invention aims to provide an improved method for the treatment of hydrocarbons with chromylchloride, and relates particularly to the use of chromylchloride in gaseous phase for treating petroleum and other mineral oils and hydrocarbon constituents thereof.

It is already known that chromylchloride ($CrO_2Cl_2$) reacts with aromatic and aliphatic hydrocarbons when it is used in liquid phase. It is also known that chromylchloride in liquid phase enters into reactions with mineral oils. The reactions are extremely violent and the procedure is dangerous if the liquid chromylchloride is used in concentrated form. Even if the reaction is made at room temperature, nearly always self-inflammation occurs as soon as the products are brought in contact with each other. If the reaction is made carefully at reduced temperatures, then it is sometimes possible to avoid an inflammation; but precipitates are formed consisting of metal-organic chromium compounds which are self-inflammable, for example, upon scraping with a glass rod, and these metal-organic precipitates even possess explosive properties, detonating when exposed to shocks.

For these reasons chromylchloride had to be used in diluted form. As diluting materials carbon bisulfide, acetic acid, chloroform, carbon tetrachloride and others have been employed, but it became apparent later that the chromylchloride reacted also with the diluents, causing undesirable reactions.

In treating hydrocarbons with chromylchloride in liquid phase, either in concentrated or diluted form, an oxidation as well as a chlorination may take place. The precipitate upon agitating with water, alcohol or ether, may decompose, forming aldehydes, ketones, acids and inorganic chromium compounds.

We have discovered that chromylchloride may be used to much greater advantage and without any danger of explosion by employing the reagent in vapor phase, without need of a liquid diluent.

Chromylchloride boils at 242° F. and begins to decompose at 356° F. but may be vaporized by means of a carrier gas at much lower temperatures.

In order to carry out our invention the chromylchloride vapors are introduced into the hydrocarbons in mixture with an inert carrier gas such as carbon dioxide or nitrogen and passed through a vessel containing the hydrocarbon material to be treated, or the latter, which may be either in liquid or vapor phase, may be passed into a vessel containing the chromylchloride vapors. Liquid or liquefied hydrocarbons may be sprayed into a vessel containing the vapor and a carrier gas, in which case the hydrocarbons will be treated substantially or in part in the liquid phase, the liquid being in subdivided form and below the vaporizing temperature.

Suitable apparatus for carrying out the invention is illustrated in the accompanying diagrammatic drawing, and comprises a reaction vessel or tower 11 which is suitably insulated to maintain the desired temperature within and is connected to the oil supply tank 12 through a pipe 13 provided with a valve 14 and a circulating pump 15 discharging through a pipe 16 into the upper part of the tower 11. A spray device 17 is preferably provided at the discharge end of the pipe 16 for breaking up and scattering the oil as it enters the reaction chamber. The chromylchloride vapor is preferably supplied to the reaction chamber from the vaporizing tank 18 through the pipe 19 which is jacketed to prevent the vapor from condensing. A heating jacket 20 is provided for the chromylchloride vaporizing tank to enable the liquid therein to be maintained at the right temperature to produce a vapor mixture of the desired proportions when a carrier gas is introduced.

In the apparatus illustrated, the carrier gas is supplied from a pressure drum 21, where it is stored under pressure, through a pipe 22 provided with a valve 23 which may be adjusted to give the desired rate of flow, to a receptacle 24 containing sulphuric acid, calcium chloride or other drying agent, from which receptacle the cleaned and dried gas is conducted to the chromylchloride vaporizing tank through a pipe 25 provided with a shut off valve 26. A by-pass pipe 27, provided with a shut off valve 28 leads directly from the drying chamber 24 to the pipe 19 near its entrance into the reaction chamber 11, for the purpose of conducting carrier gas into the reaction chamber at the close of a treating operation to free the chamber from unused chromylchloride.

The upper part of the reaction chamber 11 is supplied with broken tile, Raschig rings, or like material 29 and provided with an outlet pipe 30 fitted with a sight glass 31 leading to a condenser 32, where the chromylchloride and vaporized oil are liquefied by withdrawal of heat and the carrier gas is separated therefrom and conducted away through the pipe 33. The liquid in the condenser is drawn off through a pipe 34, and may be conducted away for use through the valved pipe 35 or returned to the reaction chamber for retreatment through the pipe 36 leading to the pipe 16 and which is provided with a pump 37 and shut off valve 38. A shut off valve 39 is placed between the pipe 36 and pump 15, and another shut off valve 40 is placed between the pump 15 and reaction chamber 11 to close or reduce the flow through these pipes as needed during the reaction process. A heat exchanger 41 is also provided for heating or cooling the liquid passing through the pipe 16 on its way back to the reaction chamber. The pump 15, by opening the valves 40 and 39 can be used to recirculate the liquid in the reaction chamber 11 through the heat exchanger 41 until the reaction is completed, as evidenced by the color of the vapors evolved.

The solid matter precipitated out from the oil collects in the bottom of the reaction chamber, and may be withdrawn periodically through the pipe 42 into one or the other of the treating and filtering chambers 43, 44, the shut off valves 45 being provided for this purpose. Removable filter sections 46, having their bottom plates 47 perforated and supplied with suitable filter cloth, are provided for catching the solid matter withdrawn from the reaction chamber 11, the filtrate being conducted away for fractionation and further treatment through the pipes 48, 49, controlled by the valves 50.

After the oily filtrate has been separated from the solid matter on the filters, two or three volumes of water is admitted to the treating chambers 43, 44, through the pipes 51, 52, fitted with shut off valves 53, and circulated through the filters and solid matter by means of the pumps 54 and return pipes 55, 56, the valves 57 in these pipes which are normally closed being opened for this purpose. The water is circulated until no more solid matter will dissolve, which can be determined by observing it through the sight glasses 58, whereupon the solution of water and organic derivatives is withdrawn through the pipes 48, 49 for separation into phases and further treatment and recovery of chromium as may be desired.

The filter chambers are provided in duplicate, so that while one may be in use to separate the reaction products the other filter section may be removed and the remaining solid matter cleaned from the cloth and the cloth dried before replacing the filter section in the apparatus. The insoluble chromium oxide and other compounds remaining in the residue may be recovered as hereinafter described.

The temperature at which we perform the invention depends upon the speed of reaction desired and upon the properties of the hydrocarbons treated. Usually the temperature at which we carry out the reaction is in the neighborhood of 70° F. When dealing with hydrocarbons of higher boiling ranges and viscosities we prefer to use elevated temperatures, but in case of very light hydrocarbon fractions we may operate at reduced temperatures. However in any case the treating temperature must be below the temperature of decomposition of the resulting metal-organic chromium compounds.

In passing the chromylchloride vapor through the hydrocarbon material, the former is absorbed and at the same time a precipitate is formed. The reaction takes place immediately and the absorption of chromylchloride is complete. As soon as chromylchloride vapors leave the reaction vessel the treatment is finished. The liquid is separated from the precipitate either by decanting, filtering or centrifuging; or by distilling the liquid from the precipitate in such cases as the remaining liquid is of low boiling range.

The liquid product, that is the liquid which has been freed from the precipitate, may be purified by fractional distillation or by treatment with specifically acting reagents, such as caustic solution for isolating the acids, and oxidizing agents for transforming the aldehydes to acids, which may then be separated out in any suitable manner. Aldehydes and ketones may also be separated by precipitation by means of sodium bisulfite, hydroxylamine, hydrazines, phenylhydrazines, hydrocyanic acid, ammonia, alkali, and other substances. We may also employ hydrogen or other reducing agents for the manufacture of primary and secondary alcohols from aldehydes and ketones respectively.

In other instances it may be desirable to substitute chlorine radicals in the product by the hydroxyl or amine group or by both. In such cases we may employ alkali or ammonia in any suitable form under proper treating conditions, or we may use for synthetic purposes generally the reaction of Grignard.

The precipitate is decomposed by heating or by treating with water, alcohols, ethers, caustic solutions or acids. If water is used for decomposing we obtain a mixture of liquid hydrocarbon derivatives and a water phase containing chromium compounds either in solid or in dissolved form. Usually the water phase contains also water soluble hydrocarbon derivatives which may be extracted by means of ethyl ether. The liquid mixture of hydrocarbon derivatives may be separated by distillation or by treating with specific chemical agents as described above for the filtrate.

The by-products are further processed for regeneration of the chromium, which is transformed to chromylchloride and reused.

Our process has great advantages as compared with those of the prior art, namely:

Whereas the reaction of hydrocarbons with liquid chromylchloride, either in concentrated or diluted form, leads to intermediary metal-organic compounds with explosive properties, our method of employing chromylchloride in vapor form produces an intermediary precipitate which does not decompose and which has no explosive charactertistics.

Moreover by using chromylchloride in vapor form, instead of in diluted liquid form, the undesired reactions with the diluent are eliminated. The exclusion of a liquid diluent, which has to be used in great quantities, according to the literature, results in important economic advantages.

The reaction in vapor phase can also be more readily controlled. The end point of the reaction can be recognized more easily so that the costly and unnecessary addition of a surplus of the reagent can be avoided.

Our process is especially feasible for the treatment of any selective solvent extract produced, for example, from straight run or cracked naphtha, kerosene or lubricating oils by means of liquid-$SO_2$, phenol, nitrobenzene, dichloroethylether and other selective solvents employed for refining. It is also applicable to the corresponding selective solvent raffinates.

Our process may also be used for processing the untreated petroleum oils and other mineral oils such as coal tar and bituminous coal tar oils, etc., or fractions thereof, including slack wax, petrolatum, recycle stocks from cracking units, still bottoms and other hydrocarbon residues.

As previously indicated, one method of carrying out our invention is to contact the hydrocarbons in vapor phase with the chromylchloride vapors. For this purpose the hydrocarbon vapors, either alone or in the presence of a carrier gas, such as $CO_2$ and $N_2$ are brought in contact with the chromylchloride vapors. The formed precipitate and liquid are again separated by means of distillation, if the hydrocarbons are of low boiling range, or by decanting, filtering or centrifuging. If feasible, the two groups of products, that is the liquid and the precipitate, may also be collected separately by fractionated condensation.

In accordance with our invention, the reaction between hydrocarbons and chromylchloride vapors may be effected in the presence of catalysts. Likewise the decomposition of the precipitate may be carried out in the presence of catalysts. Suitable catalysts for these purposes are $H_2O_2$, acids, peracids, metal oxides, and others.

Our procedure is not limited to the above steps. Instead of isolating and producing a number of representatives of chemical groups from a mixture of hydrocarbons, our invention is also useful for condensing or polymerizing components of lower molecular weight to components of higher molecular weight, which are suitable for use as lubricating oils or for improving the viscosity temperature relationship of mineral oils to which they are added. In many cases condensation products are formed which contain green color bearing compounds in concentrated form and which may be used to introduce a green bloom into mineral oils.

Condensation, by use of chromylchloride, of liquid hydrocarbon derivatives contained in or produced from the original reaction products of hydrocarbons and chromylchloride as heretofore described, may be effected to advantage in admixture with condensed nuclear aromatic hydrocarbons, such as naphthalene, anthracene, or other suitable solid hydrocarbons, preferably in the presence of a catalyst, with the object of producing substances which decrease the pour and cloud point of wax-containing minerals oils.

To further illustrate our invention, we give the following examples showing the reaction between particular mineral oil fractions and chromylchloride vapors, but the invention is not restricted to the hydrocarbon mixtures or procedures described therein.

*Example 1*

135 grams of extract, produced from kerosene by extraction with liquid-$SO_2$, having the following specifications:

Spec. gravity at 60° F.=0.908
Boiling range=359–572° F.
Per cent aromatics and unsaturates=73.3% were treated at 60° F. by passing chromylchloride vapors through the extract, using $CO_2$ as a vapor carrier. After 15 grams of chromylchloride were absorbed, the completion of the reaction was indicated by chromylchloride vapors leaving the reaction vessel. 82 grams of precipitate were formed and were separated by filtration from the liquid, which amounted to 68 grams. The original kerosene extract was of red brown color, while the precipitate was of black appearance, contrary to the yellow precipitate which is obtained by using chromylchloride in liquid phase, and the filtrate was of yellow color.

The filtrate had a specific gravity at 60° F. of 0.903 and a boiling range of 360–555° F. In distilling the filtrate we obtained a colorless fraction in the beginning, the second fraction was yellowish colored, and a residue was left having a high viscosity and a pronounced green bloom. This residue is capable of introducing a green cast into lubricating oils.

The precipitate was agitated with three times its volume of water and the resulting two liquid phases were separated from each other. The upper layer containing the organic derivatives had a specific gravity at 60° F. of 0.921, a boiling range of 350–565° F. and a dark red color. Upon distilling, a first, colorless fraction was obtained. The second fraction was of yellow appearance, rich in sulphur, and the residue was of asphaltic nature, black and solid at normal temperatures. This asphaltic residue was found to contain green bloom agents which could be extracted by digesting the residue with a mineral oil.

The above mentioned upper layer, obtained by treating the solid precipitate with water, consisted mainly of aromatic components and was rich in chlorine compounds.

*Example 2*

145 grams of lubricating oil extract, obtained by treating a South Texas distillate with liquid-$SO_2$, were heated to 170° F. and chromylchloride vapors were passed through the extract, using $CO_2$ as a carrier, until 7 grams of chromylchloride were absorbed. The reaction was not completed at this point. Nevertheless the treatment was stopped and the products formed were investigated. Again a black precipitate was obtained which was separated by filtration and which amounted to 72 grams, while the filtrate amounted to 80 grams.

The original lubricating oil extract had the following properties:

Specific gravity at 60° F.=0.995
Viscosity at 100° F.=241
Color=dark with bluish fluorescence These properties were materially changed by the treatment with chromylchloride. The filtrate had a specific gravity of 0.998 at 60° F., a viscosity of 274 at 100° F., and a dark brown color which changed to dark green upon contacting with clay.

The black precipitate was digested with water at about 170° F. An oil layer of fairly light color separated out. The water layer contained the chromium compounds partly in dissolved and partly in undissolved form.

*Example 3*

200 grams of a naphtha extract, obtained by extraction of naphtha with liquid-$SO_2$, were brought in contact with chromylchloride vapors at 70° F. in the same manner as described in Examples 1 and 2. After 30 grams of chromylchloride were absorbed, the treatment was stopped. A large quantity of sludge or precipitate separated out, which was filtered from the liquid.

The precipitate was of yellowish brown color. Upon agitation with water, the sludge was decomposed into a yellow layer containing hydrocarbon derivatives and into a water layer containing the chromium compounds in dissolved and undissolved form. The hydrocarbon layer contained aldehydes and ketones, as shown by reaction with sodium bisulfite.

The properties of the original extract, of the filtrate, and of the hydrocarbon derivatives obtained from the sludge, may be seen from the following table.

|  | Original extract | Filtrate | Liquid from the sludge |
|---|---|---|---|
| Spec. grav. at 60° F | 0.814 | 0.823 | 0.852 |
| Boiling range ° F | 220-310 | 228-316 | 228-382 |
| Color | Colorless | Colorless | Yellow |

In distilling the liquid, obtained from the sludge or precipitate, a considerable quantity of viscous residue boiling above 382° F. and having a brown red color was obtained.

In the claims, where the hydrocarbon mixture is not specified as being either in the liquid phase or in the vapor phase, it may be in either or partly in both.

What we claim is as follows:

1. A method of treating a mixture of mineral oil hydrocarbons comprising contacting said mixture with chromylchloride vapor supplied in controlled amount to a reaction vessel in presence of a carrier gas, said contacting being effected in the reaction vessel at a temperature not exceeding 356° F. and under such conditions of pressure that, due to the influence of the carrier gas, substantially all of the chromylchloride is in vapor phase while in contact with the mineral oil hydrocarbon mixture, whereby the reaction is controlled and explosions are avoided.

2. A method of treating vaporizable mineral oil hydrocarbon mixtures comprising reacting the same with chromylchloride supplied to the reaction vessel in vapor phase and in controlled amount in the presence of an inert carrier gas, said reaction taking place in the reaction vessel at temperatures of from 14° to 356° F. and under such conditions of pressure that, due to the influence of the carrier gas, substantially all of the chromylchloride exists in vapor phase while in contact with the mineral oil hydrocarbon mixture, whereby the reaction is controlled and explosions are avoided, and separating the liquid phase from the solid precipitate formed by the reaction.

3. A process of refining hydrocarbons and for the production of hydrocarbon derivatives comprising contacting a mixture of hydrocarbons in liquid phase with chromylchloride supplied to a reaction vessel in vapor phase and in controlled amount in presence of an inert carrier gas, said contacting being effected in the reaction vessel at a temperature below the decomposition temperatures of the products thereby formed and under such conditions of pressure that, due to the influence of the carrier gas, substantially all of the chromylchloride exists in vapor phase while in contact with the liquid hydrocarbon mixture, whereby the reaction is controlled and explosions are avoided, and separating out the solid precipitate formed.

4. A process of refining hydrocarbons and for the production of hydrocarbon derivatives comprising contacting a mixture of hydrocarbons in liquid phase with chromylchloride supplied to a reaction vessel in vapor phase and in controlled amount in presence of an inert carrier gas, said contacting being effected in a reaction vessel at a temperature not exceeding 356° F. and under such conditions of pressure that, due to the influence of the carrier gas, substantially all of the chromylchloride exists in vapor phase while in contact with the liquid hydrocarbon mixture, to form a chromium containing precipitate while avoiding explosions, separating the liquid from the solid precipitate by physical means, decomposing said solid precipitate to obtain an oil phase and a chromium containing by-product, and separating the latter from said oil phase.

5. A process according to claim 4 in which the precipitate is decomposed into an oil phase and a chromium containing by-product by heating.

6. A process according to claim 4 in which the precipitate is decomposed into an oil phase and a chromium containing by-product by treating with a solvent.

7. A process according to claim 4 in which the precipitate is decomposed into an oil phase and a chromium containing by-product by treating with a chemical reagent.

8. A process according to claim 4 in which the precipitate is decomposed into an oil phase and a chromium containing by-product by treating with a solvent of the class of alcohols and ethers.

9. A process for the manufacture of highly viscous fractions which are able to improve the character of hydrocarbon oils by condensing and polymerizing compounds of lower molecular weight contained in a liquid hydrocarbon mixture by means of reaction between said liquid hydrocarbon mixture and chromylchloride vapor supplied to the reaction vessel in controlled amount in the presence of an inert carrier gas, effecting said reaction in the reaction vessel at a temperature not exceeding 356° F. and under such conditions of pressure that, due to the influence of the carrier gas, substantially all of the chromylchloride exists in vapor phase while in contact with the liquid hydrocarbon mixture, whereby the reaction is controlled and explosions are avoided.

ERNEST TERRES.
ERICH SAEGEBARTH.
JOSEF MOOS.